March 12, 1974  H. SHALIT  3,796,647

APPARATUS FOR HYDROGEN PRODUCTION

Original Filed March 17, 1969

INVENTOR.
HAROLD SHALIT.
BY Donald W Canady
ATTORNEY

३,७९६,६४७
APPARATUS FOR HYDROGEN PRODUCTION
Harold Shalit, Drexel Hill, Pa., assignor to Atlantic
Richfield Company, Philadelphia, Pa.
Original application Mar. 17, 1969, Ser. No. 807,864, now
Patent No. 3,580,823. Divided and this application
Jan. 11, 1971, Ser. No. 105,617
Int. Cl. B01k 3/04; C22d 3/02
U.S. Cl. 204—246          5 Claims

ABSTRACT OF THE DISCLOSURE

An improved process and apparatus for the production of hydrogen of high purity whereby a carbonaceous fuel is reformed to produce hydrogen and said hydrogen is recovered economically from said reforming operation through the use of an electrolytic process using chemical energy of the reforming process to reduce electrical energy needed and in a molten electrolyte environment.

RELATED APPLICATIONS

This is a divisional application Ser. No. 807,864, filed Mar. 17, 1969, now U.S. Pat. No. 3,580,823.

Ser. No. 527,962, filed Feb. 16, 1966, entitled Fuel Cell Electrodes, now abandoned.

BACKGROUND OF THE INVENTION (1) Field of the invention.—This invention relates to methods of electrochemically producing high purity hydrogen from carbonaceous feeds and to the apparatus used for said hydrogen production process.

(2) Description of the prior art.—Hydrogen is generated or produced either as a reaction product or as a decomposition product. Some of the principal methods for the production of hydrogen include: (a) the electrolytic process in which hydrogen is obtained by the electrolysis of water or as a by-product in other electrochemical processes such as the electrolysis of aqueous solutions of sodium chloride; (b) the hydrocarbon decomposition process; (c) the steam-methanol process; (d) the steam-iron process; (e) the water-gas process; (f) the non-hydrocarbon dissociation process; (g) the steam hydrocarbon process utilizing natural gas or propane; and (h) the partial oxidation process.

Recent developments have led to greater requirements for high purity hydrogen. The aforementioned processes, with the exception of the electrolytical production of hydrogen, produce hydrogen in an impure form which must later be purified to meet the requirements of the hydrogen user. Prior art methods of purifying hydrogen include "scrubbing" the gas stream with materials such as caustic soda and potassium carbonate solutions. Gas fractionation and washing with liquid nitrogen are also used. Membranes have been developed which are selectively permeable only to hydrogen. The permeability of such membranes may vary with the thickness of the membrane, its composition, and with the temperature and pressure under which the membrane is used. At room temperature using conventional electrolysis the theoretical voltage required to electrolyze water is 1.23 volts while due to internal losses commercial processes require a potential difference of approximately 2 volts or greater to actually electrolyze water. Under these conditions the power costs in conventional electrolysis is approximately 85 to 90 percent of the hydrogen production costs, hence the production costs in prior art processes for electrolytical production of pure hydrogen have been prohibitive.

SUMMARY OF THE INVENTION

Briefly the apparatus and process of my present invention involves a steam reforming anode and a hydrogen evolving cathode immersed in molten electrolyte and having an outside source of D.C. current connected across the electrodes. When the apparatus is used in accordance with this disclosure high purity hydrogen can be produced at a cost that is competitive with that found in the hydrogen production industry. The reactions involved are (using $CH_4$ for example as fuel)

Anode $$CH_4 + H_2O \rightarrow CO_2 + 4H_2$$

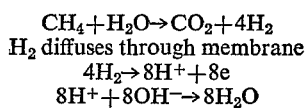

$$4H_2 \rightarrow 8H^+ + 8e$$
$$8H^+ + 8OH^- \rightarrow 8H_2O$$

Cathode

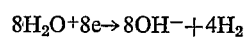

The steam reforming anode is designed for in situ hydrogen generation while immersed within the electrolyte. The aforementioned co-pending application describes an anode suitable for use in this invention and said application is incorporated by reference. The anode has a reforming chamber having a surface permeable only to hydrogen at the process operating temperature. This permeable surface may be a membrane in the form of a tube or a thimble, or the membrane may be incorporated as a wall of the reforming chamber. Suitable membranes may be constructed of palladium, palladium-silver alloys, other palladium alloys, or base metals with a palladium coating on both sides. When using palladium coated base metals the palladium should be attached to the frame by explosive bonding, electroplating, vacuum sputtering, or other methods which will not allow an intervening metal oxide film between the palladium and the base material. Suitable base metals are tantalum, wolfram, zirconium, iron and nickel. A steam reforming catalyst is placed in the reforming chamber by conventional means. Suitable catalysts are: supported nickel, alkali impregnated supported nickel, supported palladium or platinum, or any other known steam reforming catalyst. The anode is provided with inlet and outlet tubes so that a fuel gas and steam may be charged into the reforming chamber and exhaust gases of the reforming reaction removed therefrom.

The molten electrolyte should be a liquid material boiling at above 600° C. which has a good electrical conductivity and is stable under the temperature and chemical conditions of the cell. Molten salts, preferably alkali metal hydroxides including lithium hydroxide, sodium hydroxide, potassium hydroxide, cesium hydroxide, and rubidium hydroxide, or combinations thereof, are suitable electrolytes. Molten acid sulfates, phosphoric acid, acid sulfonates, and bicarbonates, etc. are also suitable electrolytes for this purpose.

The cathode may any electrical conductor which is relatively inert to the electrolyte, and preferably is a sheet of metal of low hydrogen over-voltage such as nickel, platinum or palladium or a sintered form of these materials. It is preferable that the cathode material be catalytic for the evolution of hydrogen from water.

During operation of my apparatus the ionized hydrogen passing through the membrane reacts with the molten hydroxide ions to form water. This water passes through the electrolyte to the cathode where it is electrolized to produce hydrogen and return the hydroxide ions used in the anodic reaction to the electrolyte. By eliminating the oxygen producing anode from my electrolysis process I have eliminated one of the greater voltage loss sources found in conventional electrolysis. Furthermore, the theoretical voltage required to electrolyze water under the operating temperature of my process is less than 0.95 volt as opposed to 1.23 volts required when operating at room temperature. With these two factors working to my benefit I have found that it is possible to produce hydrogen with a cell voltage of less than 0.5 volt and a current density of at least 200 ma./cm.$^2$ of electrode surface using the process and apparatus of my invention.

In general, the objectives of this invention can be accomplished by utilization of steam reforming-electrochemical apparatus at high temperatures.

An object of the present invention is to provide an improved process for the production of high purity hydrogen at the cathode of an electrolytic cell.

Another object is to replace electrical energy with less expensive chemical energy in a hydrogen production process.

A further object is to provide a new and improved hydrogen production process and apparatus that is economically competitive with present commercial processes.

Other objects will become apparent from the description hereinafter developed and from consideration of this disclosure in connection with the drawings.

DESCRIPTION OF THE PREFERRED EMBODIMENT

Figure 1:
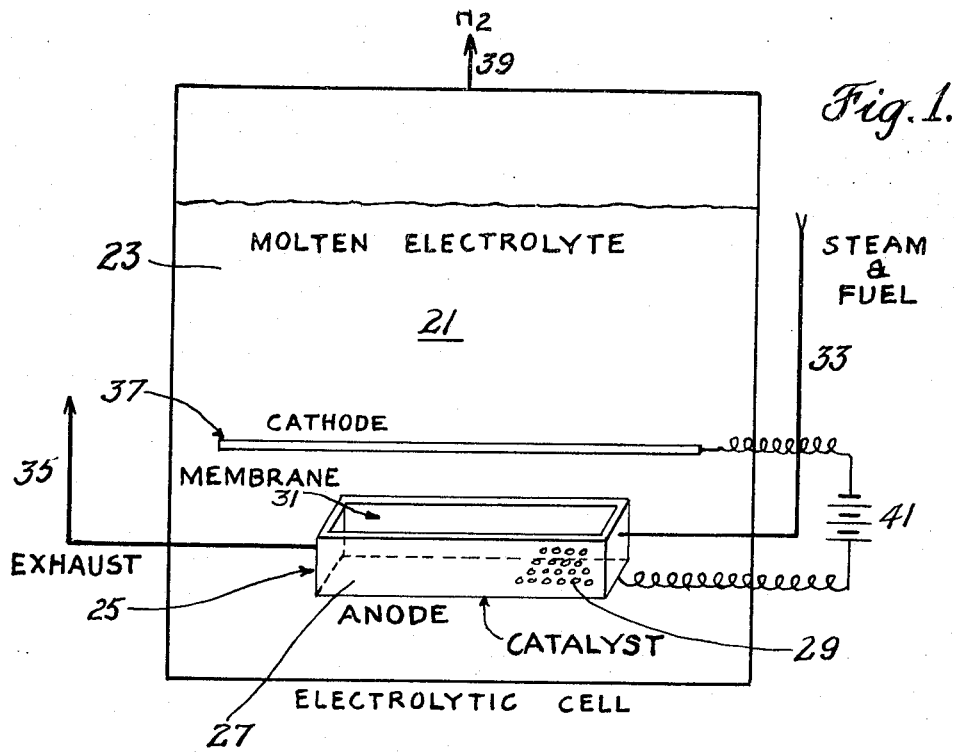
FIG. 1 is a diagrammatical representation of an electrolytic cell with a reforming chamber therein. In the cell hydrogen passes through the selectively permeable membrane of the anode into the electrolyte, forming water which is carried to the cathode where hydrogen is evolved and collected. The cell is designed so that the natural tendency of steam to rise as it forms will assist in the transfer of steam to the cathode in a more efficient manner.

Referring to FIG. 1 the electrolytic cell 21 is filled with a molten hydroxide electrolyte 23. The anode 25 having a reforming chamber 27 therein containing a supported nickel steam reforming catalyst 29 is placed into the electrolyte. One wall of said anode is constructed of a palladium-silver alloy membrane 31, permeable only to hydrogen at the operating temperature of the fuel cell, which is between 400 and 600° C. Preferable operating temperature for the cell is between 450 and 550° C. The anode has a conduit 33 suitable for introducing fuel and steam into the reforming chamber.

The fuel, which may be methane, ethane or other gaseous hydrocarbons, gasoline or other liquid hydrocarbons, carbon monoxide or carbon monoxide containing gases such as water gas, methanol or other volatilizable carbonaceous material, is charged to the anode in a ratio of at least 2 moles of water per mole of carbon in the carbonaceous fuel; preferably the ratio is about 2.2 to 5.0 moles of water per mole of carbon in the carbonaceous fuel. Although higher ratios can be used, the preferred range pushes hydrogen production close to theoretical maximum under the operating conditions. The anode also contains a conduit 35 for removing exhaust gases from the reforming chamber.

The cathode 37 is a sheet of porous nickel which may have a catalyst deposited thereon which is immersed in the molten electrolyte. The physical location of the cathode with respect to the anode allows all of the water formed at the anode to pass through the electrolyte and be electrolized at the cathode to produce hydrogen in a manner that efficiently utilizes the applied current. A conduit 39 in the electrolytical cell housing allows the hydrogen evolved at said cathode to be removed from the cell and collected.

An outside D.C. current source 41 is connected across the anode 25 and the cathode 37. Application of the current causes the electrode reactions previously described to take place. Constant removal of hydrogen from the outside surface of the anode by the anodic reaction creates an extremely low hydrogen partial pressure at that point which allows hydrogen diffusion from inside the reforming chamber at a high rate. The cathodic reaction evolves hydrogen at a rate equivalent to the diffusion rate of hydrogen through the membrane and this evolved hydrogen is removed from the cell through conduit 39.

Figure 2:
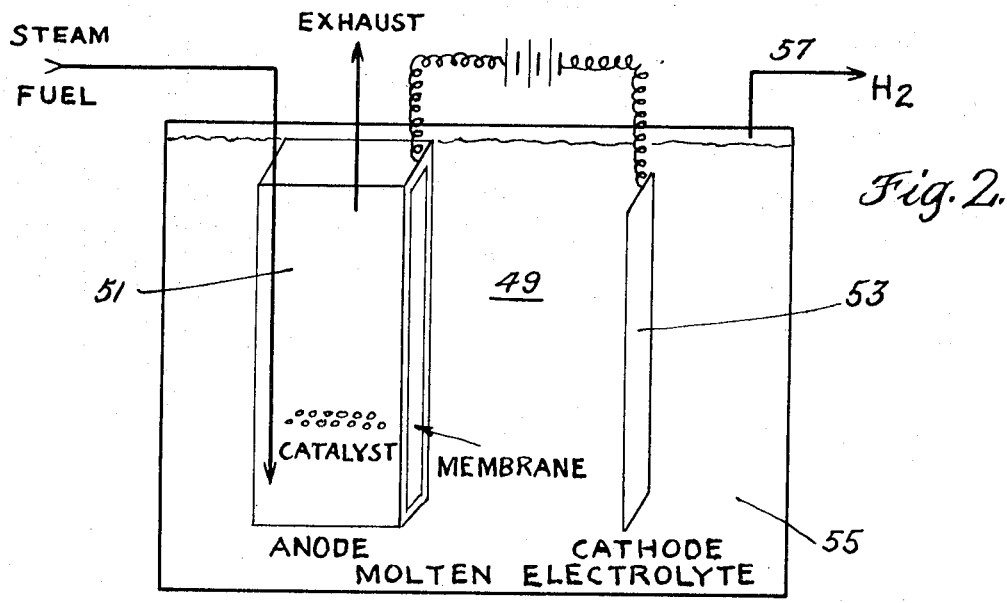
FIG. 2 is another pictorial representation of the apparatus of my invention showing a variation of how the anode and cathode can be physically located within an electrolytic cell.

FIG. 2 is another diagrammatic view of an electrolytic cell 49 incorporating the embodiments of my invention and shows that the physical setup is not to be construed as limiting factors in this disclosure of my apparatus and process for the production of hydrogen.

The anode 51 and the cathode 53 are immersed in the molten electrolyte 55 in such a manner that the water produced at the anode will pass through the electrolyte to the cathode when hydrogen gas is evolved and collected through conduit 57. The other features are similar to those of FIG. 1.

EXAMPLE 1

A cell was set up consisting of a palladium thimble anode working against various cathodes in a molten electrolyte at 475° C. composed of 90 percent sodium hydroxide and 10 percent potassium hydroxide. Hydrogen was charged into the anode thimble and a potential was applied across the cell. Hydrogen was evolved in the cathode at coulumbic efficiencies of about 100 percent.

EXAMPLE 2

Using a palladium thimble anode containing "Girdler G-60-RS" steam reforming catalyst in the reforming chamber a methane-steam mixture was charged to the anode, the steam-methane ratio being maintained at about 2.5 moles of steam per mole of carbon in the carbonaceous fuel. This reforming anode was opposed by a nickel screen cathode, the combination being immersed in a molten electrolyte consisting of 90 percent sodium hydroxide and 10 percent potassium hydroxide at about 475° C. The cell was run with a current density of about 200 ma./cm.$^2$. The required voltage for this current was 0.3 to 0.33. The hydrogen formed at the cathode corresponds closely to 100 percent of the current drawn (100 percent current efficiency) and also to about 80 percent of the methane charged to the anode (about 80 percent fuel utilization efficiency).

I claim:

1. An electrochemical apparatus adapted for association with a voltage source imposing a D.C. potential across an anode and a cathode, for purifying hydrogen gas comprising in combination:
   an electrolytic cell adapted to contain a molten alkali hydroxide electrolyte and including a cathode and a hollow anode adapted to be immersed in said electrolyte said anode having walls, a wall of said anode having at least one hydrogen permeable surface for passing hydrogen through said anode into said electrolyte, and
   a steam reforming catalyst chamber in said hollow anode, the effluent from the catalyst chamber being a stream of gas containing carbonaceous impurities produced by steam reforming and hydrogen, said hydrogen being adapted to pass through said anode into said electrolyte, and
   means for collecting at the cathode a hydrogen stream containing a smaller amount of carbonaceous impurities than in the impure hydrogen stream produced in the steam reforming catalyst chamber, such purified hydrogen steam being evolved at the cathode.

2. The apparatus of claim 1 wherein the hydrogen permeable surface is made from a palladium containing metal.

3. The apparatus of claim 2 wherein the cathode is constructed of a relatively inert material with respect to the electrolyte.

4. The apparatus of claim 1 wherein the cathode is constructed of a metal selected from the group consisting of nickel, platinum and palladium.

5. An electrochemical apparatus comprising the combination of:

a cell including a cathode and a hollow anode adapted to contain molten alkali hydroxide;

said hollow anode adapted to be immersed in the molten alkali hydroxide electrolyte, at least one surface of said anode being a hydrogen permeable surface;

a steam reforming catalyst chamber within said hollow anode;

inlet means directing a stream of a mixture of steam and organic fuel to the steam reforming catalyst chamber, whereby the steam and fuel are converted to a mixture comprising gaseous hydrogen and gaseous carbon dioxide, the effluent from the steam reforming catalyst chamber being directed to the interior of the hollow anode;

exhaust means for withdrawing excess gas, comprising carbon dioxide, from the interior of the hollow anode, said hydrogen permeable surface being adapted to permit the permeation of hydrogen into the electrolyte for reaction with hydroxide ion to form water, which water is electrolyzed at the cathode to produce hydrogen, said hydrogen permeable surface helping to protect the molten alkali hydroxide from contact with the carbon dioxide, carbon monoxide, and organic gases in the effluent from the steam reforming chamber, and the hollow anode; and means for withdrawing hydrogen gas discharged at the cathode.

References Cited

UNITED STATES PATENTS

| | | | |
|---|---|---|---|
| 3,544,374 | 12/1970 | D'Alessandro et al. | 204—129 X |
| 2,749,293 | 6/1956 | Wahlin | 204—129 X |
| 3,616,334 | 10/1971 | Aker et al. | 204—129 |

JOHN H. MACK, Primary Examiner

D. R. VALENTINE, Assistant Examiner

U.S. Cl. X.R.

204—129, 247, 284, 292